W. E. YOUNGER.
COMBINED HARROW AND ROLLER.
APPLICATION FILED OCT. 27, 1910.
1,023,058.
Patented Apr. 9, 1912.
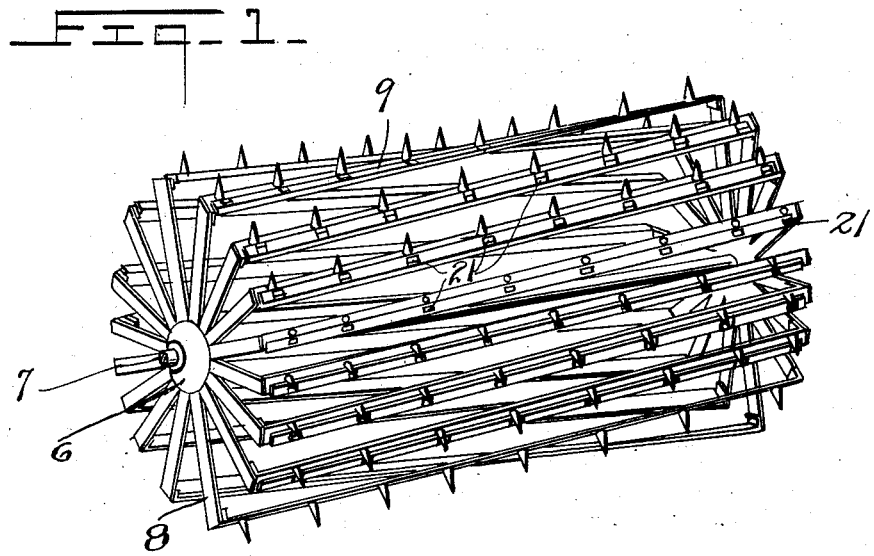
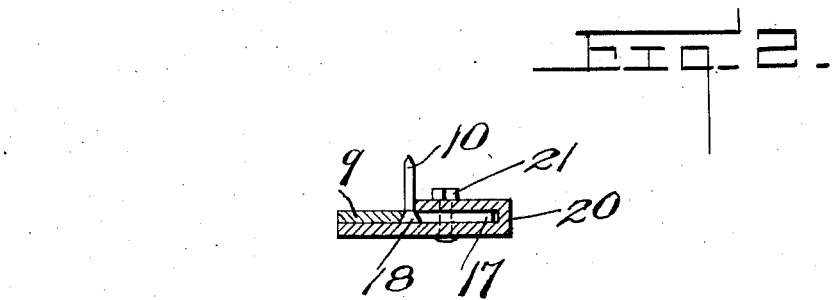
Witnesses
E. E. Johansen.
M. L. Lew
Inventor
Walter E. Younger.
By Woodward & Chandlee
Attorneys

UNITED STATES PATENT OFFICE.

WALTER E. YOUNGER, OF PORT ARTHUR, TEXAS.

COMBINED HARROW AND ROLLER.

1,023,058.          Specification of Letters Patent.          Patented Apr. 9, 1912.

Application filed October 27, 1910. Serial No. 589,310.

*To all whom it may concern:*

Be it known that I, WALTER E. YOUNGER, a citizen of the United States, residing at Port Arthur, in the county of Jefferson and State of Texas, have invented certain new and useful Improvements in a Combined Harrow and Roller, of which the following is a specification.

This invention relates to improvements in a combined harrow and roller, and is particularly adapted for pulverizing the ground or destroying the undesirable growth emanating from the land.

The object of the invention is the provision of wheels having spokes which are connected by diagonally arranged bars, the outer surfaces of which are concentrically arranged in respect to the axis of said wheels, whereby a perfect and practical harrow is constructed, which is adapted to roll upon the ground to be operated upon.

With these and other objects in view, the present invention consists in the combination and arrangement of parts which will be hereinafter more fully described and claimed.

In the drawings, Figure 1 is a perspective view of the complete invention. Fig. 2 is an enlarged sectional view of one of the bars.

The wheel consists of hubs 6 which are secured to a transverse shaft 7, said shaft being adapted to be journaled in the opposite side members of a frame (not shown), and radially projecting from said hubs are spokes 8 to the outer ends of which are secured bars 9 which are arranged diagonally in respect to the general construction of the wheel of which they form a part.

As clearly shown in the drawing, teeth 10 are provided and are rigidly secured to the diagonally arranged bars 9 of the wheel and project therefrom. The teeth 10 are attached to the bars 9 in such a manner as to be readily and conveniently detached and removed from the wheel, when it is desired to use the same as a land roller.

In order to accomplish the above results in a practical manner the diagonally arranged bars 9 of the wheel are provided with a series of slots 17 which freely but snugly receive the head portions 18 of the pins 10, and in order to hold said pins in a rigid and secure position plates 19 are employed which are substantially the same length as the bars 9 and are provided with L-shaped engaging portions 20 which embrace the diagonally arranged bars about the slotted portions 17 thereof, the formation of said plates and their respective positions in respect to the bars 9 operating to hold the pins 10 in a rigid position.

In order to properly hold the plates 19 in a detachable position in respect to the bars 9, bolts 21 are passed through said plates and bars as clearly shown in Fig. 2 of the drawings, the bolts referred to passing through the openings formed in the bars 9, whereby a very simple and practical construction is obtained for holding the harrow pins 10 in a secure position upon the wheel.

It will be apparent that changes in the form, proportion and minor details of construction may be resorted to without departing from the spirit or sacrificing any of the advantages of this invention.

What is claimed is:

1. In a harrow, a shaft, spokes projecting radially from said shaft, diagonally disposed bars secured to said spokes, said bars having slots formed in the rear edges thereof, pins having heads slidably engaged in said slots, said pins projecting outwardly from the bars, and U-shaped plates fitting over the rear portions of the bars, said plates having their forward edges bearing against the pins to prevent rearward movement of the pins in the slots, and bolts for removably securing the plates in position on the bars.

2. In a machine of the character described the combination with suitable wheels for contact with the ground to be operated upon, of bars forming a part of said wheels and having slots formed therein along their length, pins removably located within said slots, plates secured to the bars and provided with overlapping portions for contact with the pins, and bolts passed through said plates and through the bars for securing the plates in position.

In testimony whereof I affix my signature, in the presence of two witnesses.

WALTER E. YOUNGER.

Witnesses:
    JOHN F. RADER,
    H. H. BROWN.

Copies of this patent may be obtained for five cents each, by addressing the "Commissioner of Patents, Washington, D. C."